United States Patent [19]
Fontecchio et al.
[11] Patent Number: 4,909,700
[45] Date of Patent: Mar. 20, 1990

[54] LIFT FOR WHEELCHAIRS

[75] Inventors: Bruce E. Fontecchio, Knoxville; Adolf Spiegelhalter, Chattanooga, both of Tenn.

[73] Assignee: Invercan, Inc., Knoxville, Tenn.

[21] Appl. No.: 306,349

[22] Filed: Feb. 3, 1989

[51] Int. Cl.[4] .................. B60P 1/44

[52] U.S. Cl. .................. 414/549; 414/558; 414/917; 414/921; 187/9 R; 280/163; 254/10 R

[58] Field of Search .................. 414/546, 549, 552, 556, 414/558, 917, 921; 187/9 R, 8.72; 280/163, 166; 254/10 R, 10 C, 427, 124

[56] References Cited

U.S. PATENT DOCUMENTS

| | | | |
|---|---|---|---|
| 2,676,720 | 4/1954 | Noble | 254/10 C |
| 2,732,960 | 1/1956 | Nilson | 414/549 |
| 3,955,827 | 5/1976 | Wonigar | 280/166 |
| 4,134,504 | 1/1979 | Salas et al. | 414/558 |
| 4,158,524 | 6/1979 | Serafin | 414/921 X |
| 4,205,862 | 6/1980 | Tarvin | 280/166 |
| 4,325,668 | 4/1982 | Julian et al. | 414/546 |
| 4,673,328 | 6/1987 | Shiels | 414/917 X |

FOREIGN PATENT DOCUMENTS

| | | | |
|---|---|---|---|
| 2107671 | 5/1983 | United Kingdom | 414/558 |
| 2617754 | 11/1977 | Fed. Rep. of Germany | 414/921 |
| 983381 | 6/1951 | France | 254/427 |

*Primary Examiner*—Robert J. Spar
*Assistant Examiner*—Robert S. Katz
*Attorney, Agent, or Firm*—Norton & Luhn

[57] ABSTRACT

The lift is installed under the cargo floor proximate to the side door of the van. In the retracted position it is entirely concealed and does not obstruct the normal van usage. Stationary track members are attached to the van. Slidably mounted within the track members are frame members which may be extended or retracted from the van by use of a pair of worm gears. A pair of hydraulic cylinders interconnect the platform and the frame using four links which raise and lower the platform equalangularly. The equalangular motion of the links maintains the platform in a substantially horizontal position as it is lowered from its raised position level with the floor of the van to its lower position with the street or sidewalk.

4 Claims, 3 Drawing Sheets

36
87

36
87

36
88
98
56
94

80
86
87
104
84
90
96
92
78
100
82

LIFT FOR WHEELCHAIRS

This invention relates to a new and improved lift for wheelchairs whereby a wheelchair or other load (hereinafter referred to as "wheelchair" for convenience) may be raised from the ground to an elevated height level with the floor of a van or other vehicle. Heretofore raising a wheelchair into a vehicle has been a difficult problem. Although there are lifts in existence, these mechanisms have considerable disadvantages which are overcome by the present invention.

A feature of the present invention is the fact that the mechanism is retracted between uses into position beneath the vehicle door so as not to present an obstruction to the door nor project outside the contour of the van.

A principal feature of the present invention is that it is a passive lift in that the doorway of the vehicle is usable in normal fashion between uses. Heretofore, most lifts of this general type have required that the door be dedicated to the use of the lift in that the doorway is not usable except for lift purposes. Because the present invention has a storage position completely concealed beneath the floor and within the vehicle and is not in any way interfering with normal usage of the vehicle, considerable versatility and use of the van is accomplished.

Another feature of the invention is the fact that there is only a minimum modification of the van required to install the lift structure to the original vehicle equipment.

No part of the lift is within the vehicle cargo area but is concealed below the floor. This means that no part of the lift mechanism exposes personnel to any dangerous portions of the lift mechanism.

Because the lift mechanism fits within the vehicle and below the cargo area of the van, no portion of the lift interferes with any of the van's operation. That is, no portion of the lift frame or mechanism interferes with the drive shaft, exhaust system or other mechanisms usually found outside and beneath the floor of the vehicle. The preferred embodiment, more particularly descried hereinafter, permits a full extension of the lift by use of a pair of ball screws.

Another feature of this invention is that the lift mechanism is stored within the van and thus not subject to the harsh elements. This in turn extends the life of the lift mechanism.

Another feature of this invention is the outboard stop which prevents the wheelchair from inadvertently rolling from the platform and spilling the occupant of the wheelchair.

A still further feature of the invention is the means by which the lift platform may be raised from ground level to the level of the floor of the van and then returned to ground level for unloading. In order to move the lift to its storage position, the lift platform is positioned at its uppermost level and retracted into an envelope within the van and beneath the inner floor.

Another feature of the lift is that the geometry of the lift arms or links. The lift platform travels through an arc that is designed to clear the door sill and lower step and yet match the floor edge inside the van without any additional modification. The lift geometry further allows the platform to contact the sidewalk or street reasonably near the van so that the van does not roll excessively from tongue created by the extension of the platform mechanism.

Another important concept of this invention is the parallel linkage which raises and lowers the platform. The design of this linkage resists lateral movement thus making the lift stable.

Another important feature of this lift is that it is assembled into a single compact package that can be quickly and simply installed. The unit mounts within the van with the only modifications necessary being the forming of the envelope beneath the floor of the van.

Other objects of the present invention will become apparent upon reading the following specification and referring to the accompanying drawings in which similar characters of reference reference corresponding parts in each of the several views.

The lift of the present invention is intended for use with a van 10. One such van is shown schematically in the accompanying drawings, it being understood that commercially available vans may differ in detail of construction. One advantage of this invention is th fact that it may be installed within a variety of different commercially available vans with a minimum of alteration to the van. In a preferred installation, the invention is attached above the frame of the van beneath the inner floor 12 of the van and positioned directly in front of the side door of the van. The floor 12 of different vans may be at different levels from the ground. In most constructions, to accommodate the swinging or sliding of the side doors there is a ledge at a lower level from the floor 12 projecting out to the side of the van. Van side member 22 is located below floor 12 and the invention is bolted or otherwise permanently attached above the van side member 22 and below floor 12. It will be noted that in its proper installation the device is entirely within the enclosure 16 formed by van side member 22 and floor 12. Additionally, the mechanism is stored within the van 10 and does not in such position interfere with the normal uses of the door of van 10 or in any way project above the van floor 12.

Figure 1:
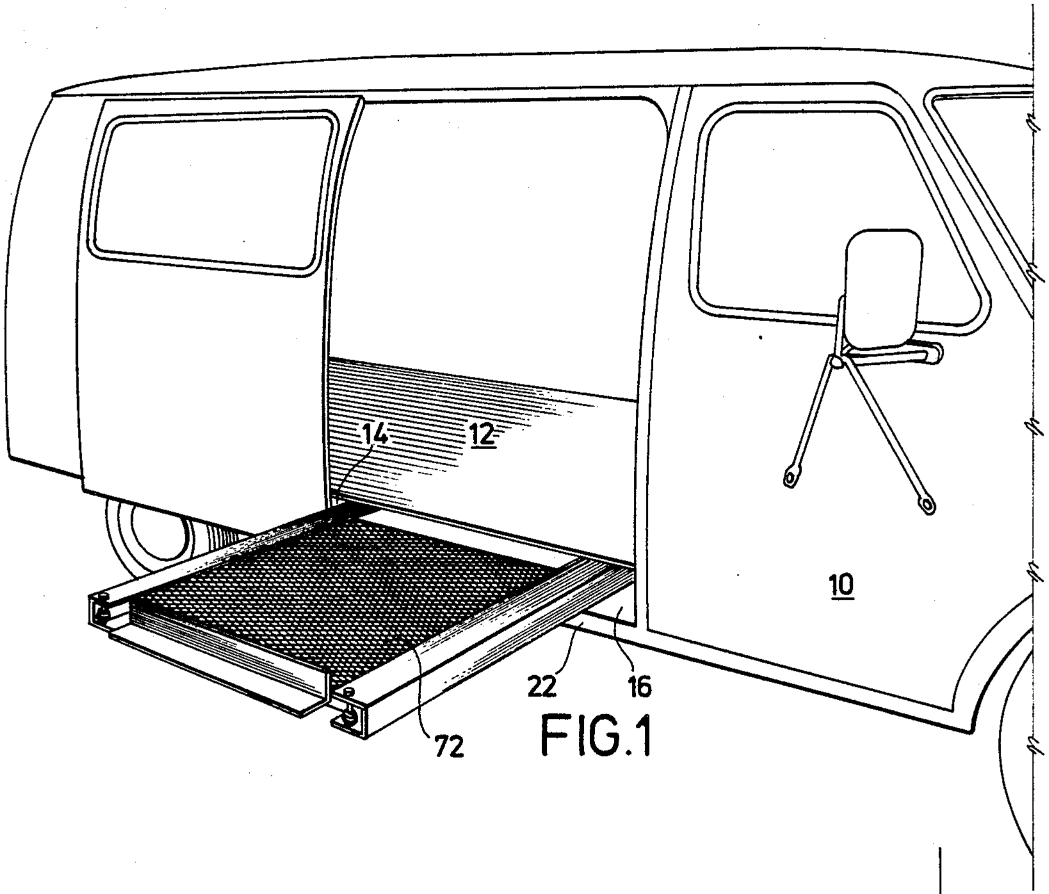
FIG. 1 is a schematic view showing the invention installed within a van with the mechanism in a position directly projected from the storage position.
Figures 3, 4, 5:
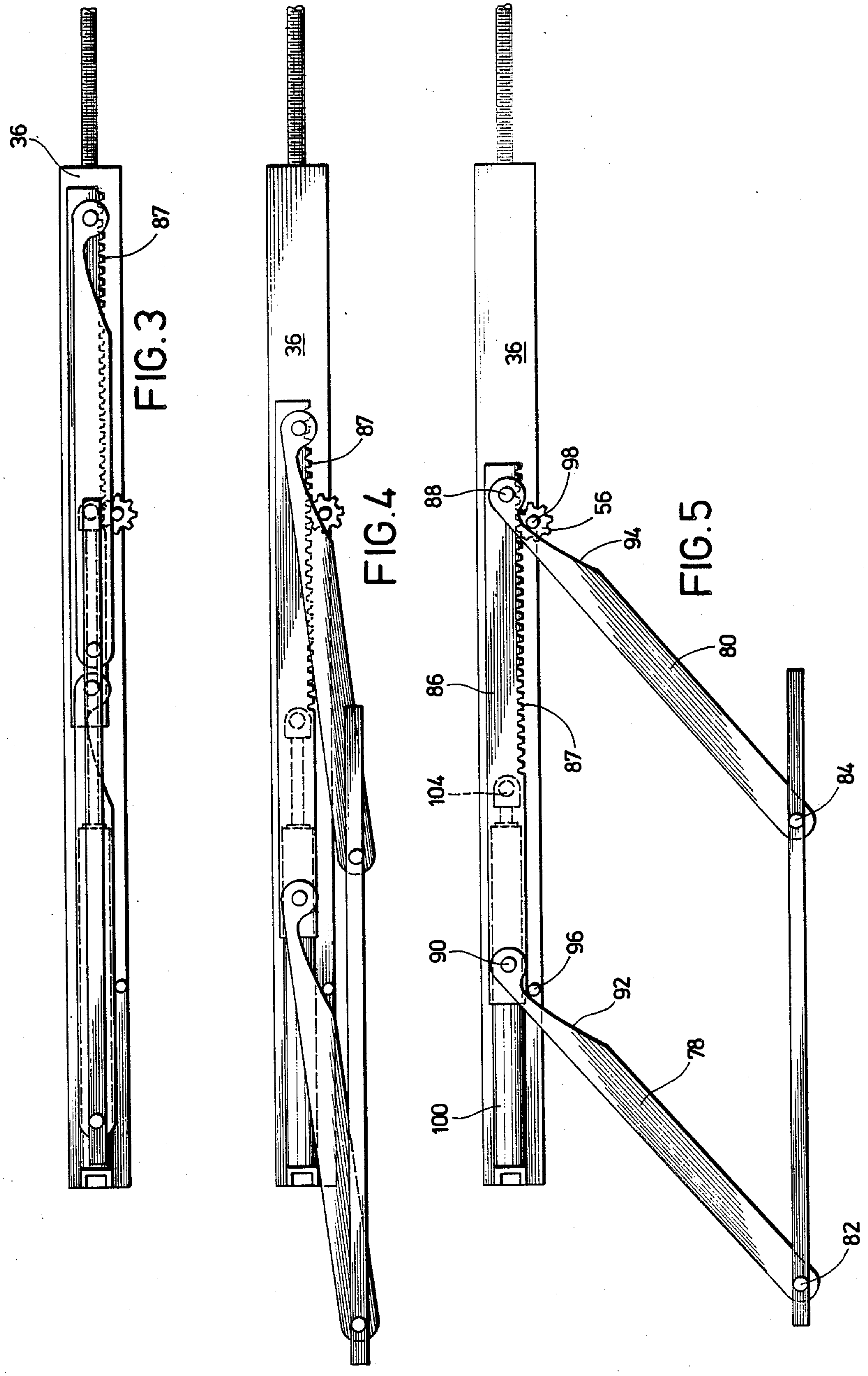
FIG. 3 is a side elevation view of the invention in its raised position.
FIG. 4 is a side elevation view of the invention with the platform slightly lowered.
FIG. 5 is a side elevation view of the invention showing the platform at its lowered position.

In normal usage, the device is extended and comes to rest level with floor 12 of the van. The user wheels his chair onto platform 72 of the device to the position shown in FIG. 3. Thereupon the platform 72 is lowered. An intermediate position is shown in FIG. 4. Finally, after the platform has travelled through its full arc, the platform is lowered completely to the ground as shown in FIG. 5. To raise the platform the reverse operation is performed. In FIG. 1, the mechanism is projected directly from its storage position within envelope 16, a position which is the first position beyond its storage position.

A box 23 is provided which is attached to the van beneath floor 12. On either side of the lift there are longitudinal track forming members 24 and 26 which are fixed within box 23 and attach to the van frame beneath floor 12 and above side frame 22. The term longitudinal and transverse are intended to be relative to van 10. The longitudinal track forming members are U-shaped members parallel to one another with the open portion of the channel facing inwardly toward each other. The inner portion of each U-shaped longitudinal track forming member 24 and 26 form stationery tracks 28 and 30, shown best in FIGS. 6 and 7.

Figure 6:
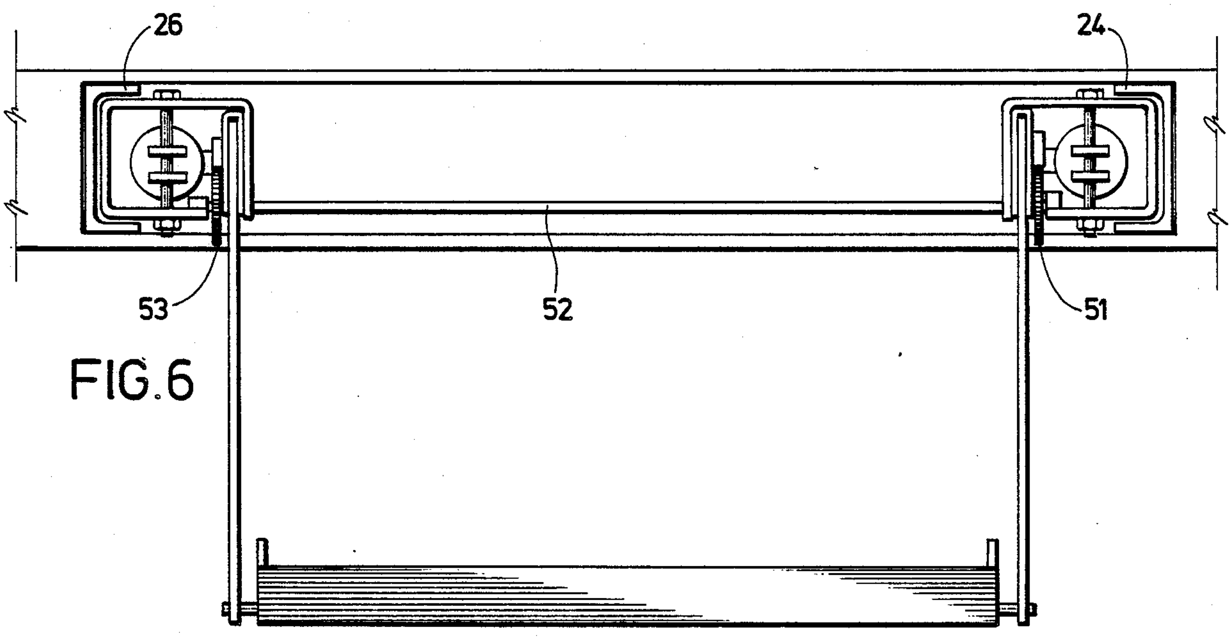
FIG. 6 is a front elevation of the invention showing the platform lowered.
Figure 7:
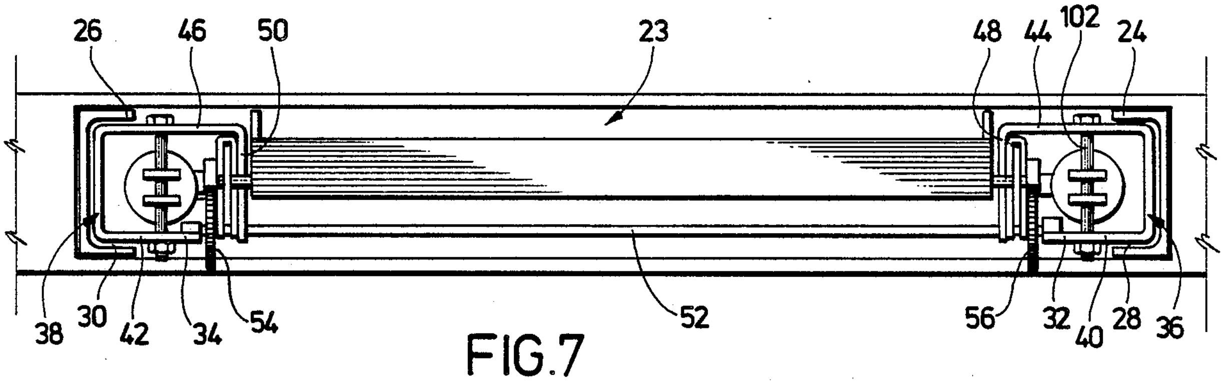
FIG. 7 is a front elevation showing the invention with the platform raised level with the floor of the van.

Horizontally slidable with tracks 28 and 30 are longitudinal frame members 32 and 34 which are of a complicated cross-section and shown in FIGS. 6 and 7. Vertically disposed angles 36 and 38 form the outer portion of members 32 and 34 respectively. Vertically disposed angles 36 and 38 have lower horizontal arms 40 and 42 respectively. The upper portion of angles 36 and 38 have upper horizontal arms 44 and 46 respectively to form the U-shaped portion of members 32 and 34 respectively. A second pair of vertically disposed members 48 and 50 are attached to members 44 and 46 and complete the complicated cross section. An axle 52 is provided laterally between frame members 32 and 34. Ends 51 and 53 of axle 52 are rotatably attached to frame member 48 and 50. A pair of gears 54 and 56 are attached to ends 51 and 53 of axle 52.

A pair of horizontal ball screws 58 and 60 are slidably mounted to member 62. Member 62 is at each end attached to the most inwardly portions of members 32 add 34. Ends 64 and 66 of screw 58 and 60 respectively are attached to a means 68 and 70 for rotating ball screw 58 and 60. Means 68 and 70 may for example be electric motors. The movement of members 32 and 34 to and from the inside of van 10 is caused when means 68 and 70 are actuated.

A platform 72 is provided. Said platform 72 is attached to side frame members 74 and 76 which re disposed longitudinal and parallel to each other. A pair of links 78 and 80 are provided for each frame member. Only one side of the link mechanism is shown it being understood by those skilled in the art that the other frame member has a similar mechanism. The lower portion of said links 78 and 80 are pivotally attached at 82 and 84 to side member 74. A rack member 6 is provided and is slidably mounted within each frame member 32 and 34. Ends 88 and 90 of links 80 and 78 are pivotally attached to each rack 86. Rack member 86 rides interrationally with gear 56 at rack gear 87. Each link 78 and 80 is provided with an inset curved portion cam member 92 and 94 respectively. Follower members 96 and 98 are attached to member 28. The follower members 96 and 98 follow and slide along cam members 92 and 94 of link 78 and 80 respectively. A similar structure is provided for member 34 and it will be obvious to those skilled in the art how such assembly should be made following the structure hereabove described.

A hydraulic cylinder 100 is mounted within each frame member 32 and 34. One end of cylinder 100 is attached to bolt member 102. Bolt member 102 in turn is attached vertically through frame members 32 and 34. The other end of said cylinder 100 is attached at 104 to rack member 86.

Figure 2:
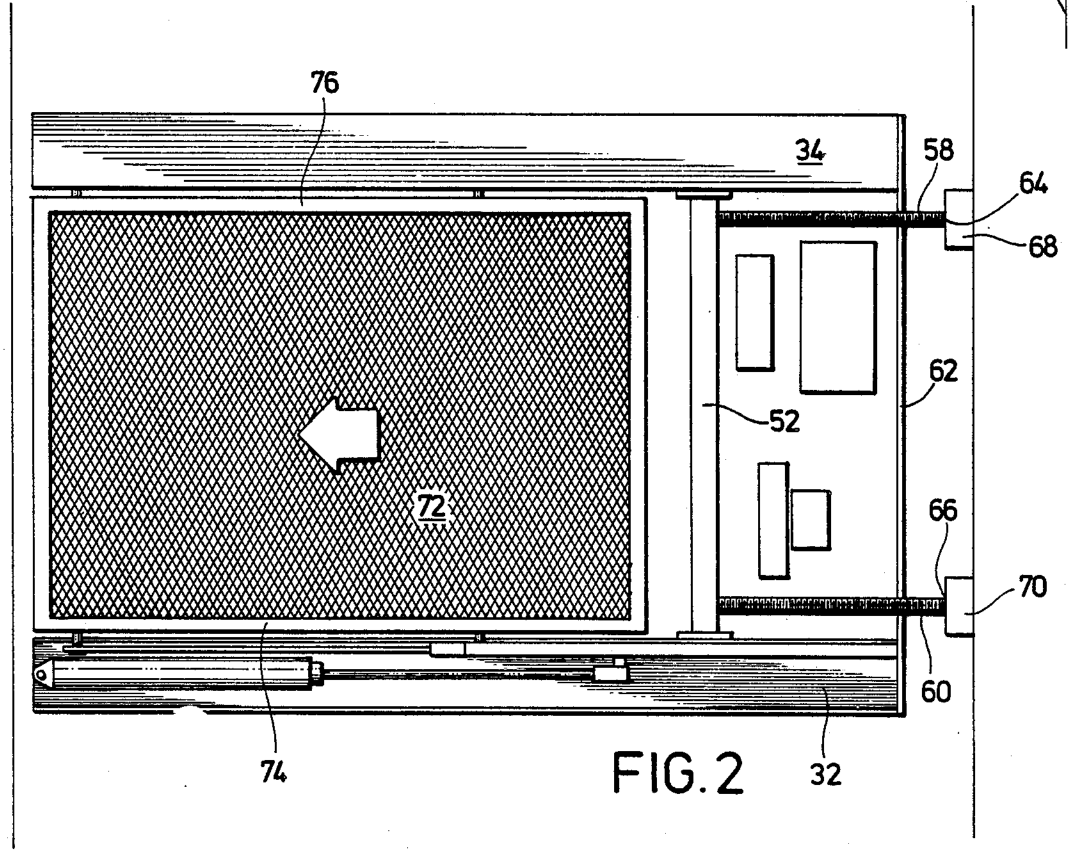
FIG. 2 is a plan view showing the invention retracted within the van.

The movement of platform 72 from the lower position shown in FIG. 6 is accomplished by actuating cylinder 100 thus causing rack member 86 to move horizontally toward the van. The angular position of the links on either side of platform 72 is maintained equiangularly as the rack member in each track member rides over gears 54 and 56. As said cylinder 100 expands, cam members 92 and 94 of links 78 and 80 respectively ride upon follower members 96 and 98. The movement of links 78 and 80 respectively over followers 96 and 98 respectively causes the lower ends of said links 78 and 80 respectively to rise which in turn carries platform 72 to its raised position level with floor 12. In the raised position, means 68 and 70 may be actuated which cause screws 58 and 60 to rotate. As screws 58 and 60 rotate, member 662 is drawn into the frame member 24 and 26 together with members 32 and 34. The platform in its retracted position is shown in FIG. 2. The relative positions between raised and lowered are shown sequentially between FIG. 3 and FIG. 5.

Although a particular embodiment has been described in the foregoing detailed description, it will be understood that the invention is capable of numerous rearrangements, modifications and substitution of parts without departing from the scope of the invention.

What is claimed:

1. A lift installed in a vehicle having an inner floor and vertical walls for a wheelchair or the like capable of lifting the wheelchair from a lower level to an upper level at said floor, comprising:

a pair of opposed longitudinal track forming members fixed to said vehicle below said floor and above the frame of same vehicle and within the projection of said van walls;

a pair of longitudinally slidable frame members horizontally slidable in said track forming members between a retracted position within said vertical walls and an outer position;

first actuating means for sliding said slidable frame members;

each said slidable frame member having;

a longitudinally slidable rack member horizontally slidable in said slidable frame member;

a first and second vertically extending link on each side of said lift, each said link pivoted at one end to a horizontal platform and at an opposite end to said rack member;

each said link having a cam surface;

each said cam surface in sliding contact with a follower;

each said follower attached to said slidable frame member, whereby the said platform is raised as said cam surface slides in contact with said follower;

means for causing all of said links to pivot equiangularly;

second actuating means for pivoting said links to move said lift from its said lower level to said upper level or the reverse.

2. A lift according to claim 1 whereby said first actuating means is a ball screw, one end of which is attached to a conventional electric motor which in turn is attached to said incasement and in contact with a lateral cross member, which lateral cross member is attached at one end to each said slidable frame member.

3. A lift according to claim 1 whereby said second actuating means is a hydraulic cylinder within each frame member, one end of which is attached to said frame member and the other end attached to said rack member.

4. A lift according to claim 1 whereby said means for causing all said links to pivot equiangularly includes an axle an end of which is rotatably attached to each frame member and each end of said axle having a gear attached and each gear in mesh with each said rack members, whereby the said rack members slide simultaneously carrying said link members maintaining equal movement.

* * * * *